United States Patent
Lin et al.

(10) Patent No.: US 11,832,029 B2
(45) Date of Patent: Nov. 28, 2023

(54) PROJECTION SYSTEM AND PROJECTION IMAGE ADJUSTMENT METHOD THEREOF

(71) Applicant: Coretronic Corporation, Hsin-Chu (TW)

(72) Inventors: Shih-Chieh Lin, Hsin-Chu (TW); Chen-Ming Li, Hsin-Chu (TW); Kang-Shun Hsu, Hsin-Chu (TW); Chia-Yen Ou, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 17/078,097

(22) Filed: Oct. 23, 2020

(65) Prior Publication Data

US 2021/0127096 A1  Apr. 29, 2021

Related U.S. Application Data (60) Provisional application No. 62/925,775, filed on Oct. 25, 2019.

(30) Foreign Application Priority Data

Jul. 24, 2020 (CN) .......................... 202010720586.4

(51) Int. Cl.
*H04N 9/31* (2006.01)

(52) U.S. Cl.
CPC .......... *H04N 9/3147* (2013.01); *H04N 9/3182* (2013.01); *H04N 9/3185* (2013.01); *H04N 9/3194* (2013.01)

(58) Field of Classification Search
CPC .. H04N 9/3147; H04N 9/3182; H04N 9/3185; H04N 9/3194; H04N 9/3141; H04N 9/3179

See application file for complete search history.

(56) References Cited

U.S. PATENT DOCUMENTS 10,063,821 B2    8/2018  Yoshimura
2007/0273795 A1* 11/2007  Jaynes ................ H04N 9/3194
                                          348/E9.027
(Continued)

FOREIGN PATENT DOCUMENTS

CN    103702096    4/2014
CN    103731648    4/2014
(Continued)

OTHER PUBLICATIONS

Office Action of China Counterpart Application, dated Feb. 11, 2022, pp. 1-6.
(Continued)

*Primary Examiner* — Jeff A Burke
*Assistant Examiner* — Sihar A Karwan
(74) *Attorney, Agent, or Firm* — JCIPRNET (57) ABSTRACT

A projection system and a projection image adjustment method thereof are provided. The projection image adjustment method is applicable to a processing device connected to multiple projectors, a display, and an input device, and includes the following steps. Arrangement information between the multiple projectors is obtained. Multiple adjustable areas corresponding to a projection image of each projector are simultaneously displayed on the display and the multiple adjustable areas are simultaneously displayed on projection images of the multiple projectors according to the arrangement information. A parameter setting interface corresponding to a first adjustable area among the multiple adjustable areas is displayed on the display. The first adjustable area corresponds to a first projector among the multiple projectors. A selection operation associated with the first adjustable area is received through the input device to adjust and display a projection image of the first projector according to a first parameter value.

15 Claims, 7 Drawing Sheets

(56) References Cited

U.S. PATENT DOCUMENTS

| | | | | |
|---|---|---|---|---|
| 2011/0211065 A1* | 9/2011 | Furui | .................. | H04N 9/3197 |
| | | | | 348/135 |
| 2013/0128057 A1* | 5/2013 | Cho | ...................... | H04N 17/04 |
| | | | | 348/189 |
| 2013/0222368 A1* | 8/2013 | Takama | .................. | G06T 15/00 |
| | | | | 345/419 |
| 2016/0295184 A1* | 10/2016 | Ishikawa | .............. | H04N 9/3147 |

FOREIGN PATENT DOCUMENTS

| | | |
|---|---|---|
| CN | 104267917 | 1/2015 |
| CN | 105376540 | 3/2016 |
| CN | 108924523 | 11/2018 |
| JP | 2007028365 | 2/2007 |

OTHER PUBLICATIONS

"Office Action of China Counterpart Application", dated Sep. 29, 2022, p. 1-p. 3.

* cited by examiner

PROJECTION SYSTEM AND PROJECTION IMAGE ADJUSTMENT METHOD THEREOF

CROSS-REFERENCE TO RELATED APPLICATION

This application claims the priority benefit of U.S. provisional application Ser. No. 62/925,775, filed on Oct. 25, 2019, and China application serial no. 202010720586.4, filed on Jul. 24, 2020. The entirety of each of the above-mentioned patent applications is hereby incorporated by reference herein and made a part of this specification.

BACKGROUND

Technical Field

The disclosure relates to a display device and a projection technology, and more particularly to a projection system and a projection image adjustment method thereof.

Description of Related Art

"Projection collage" refers to multiple projectors simultaneously projecting and collaging into a large image. When multiple projectors are projection splicing, the projection overlapping area thereof produces stacking of brightness, which will increase the brightness of the projection overlapping area. Also, due to process variations of multiple projectors, colors may be inconsistent, which causes the projection overlapping area to increase the degree of unevenness of the overall picture due to color stacking of two images. In the dark field, such phenomenon makes it easier for the viewer to visually perceive that the color performance of the image of the overlapping area is significantly different from the color of the image of the non-overlapping area. Therefore, a black level adjustment function is needed to adjust the color composition for the projection overlapping area and the non-overlapping area, so that the overall image during projection splicing will not have uneven color or abrupt color block performance.

In the current black level adjustment technology, the user needs to define the overlapping area and the non-overlapping area through the drawing of a geometric image on the provided interface. However, in the black level application of multiple projectors, it is necessary to perform multiple and tedious adjustments of block positions and colors to be able to complete. In addition, the current technology only provides the viewing angle of a single projector, and adjustments are performed by the user directly viewing the projected image. Such method not only fails to know the interactive relationship between multiple projectors, but also does not have an integrated interface to provide the user with a full-view image, which makes the overall adjustment process more complicated.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides a projection system and a projection image adjustment method thereof, which can provide an intuitive and simple way to achieve the integration of the overall projection collage image.

In an embodiment of the disclosure, the method is applicable to a processing device connected to multiple projectors, a display, and an input device, and includes the following steps. First, arrangement information between multiple projectors is obtained. According to the arrangement information, multiple adjustable areas corresponding to a projection image of each projector are simultaneously displayed on the display and the multiple adjustable areas are simultaneously displayed on the projection images of the multiple projectors. Then, a parameter setting interface corresponding to a first adjustable area among the multiple adjustable areas is displayed on the display. The first adjustable area corresponds to a first projector among the multiple projectors. Through the input device, a selection operation associated with the first adjustable area is received to adjust and display the projection image of the first projector according to a first parameter value.

In an embodiment of the disclosure, the system includes multiple projectors, an input device, a display, and a processing device. The processing device is connected to the multiple projectors and the display, and is configured to obtain arrangement information between the multiple projectors, then simultaneously display multiple adjustable areas corresponding to a projection image of each projector on the display and simultaneously display the multiple adjustable areas on the projection images of the multiple projectors based on the arrangement information, display a parameter setting interface corresponding to a first adjustable area among the multiple adjustable areas on the display, and then receive a selection operation associated with the first adjustable area through the input device to adjust and display the projection image of the first projector according to a first parameter value. The first adjustable area corresponds to the first projector among the multiple projectors.

Other objectives, features and advantages of the disclosure will be further understood from the further technological features disclosed by the embodiments of the disclosure wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting.

Figure 1:
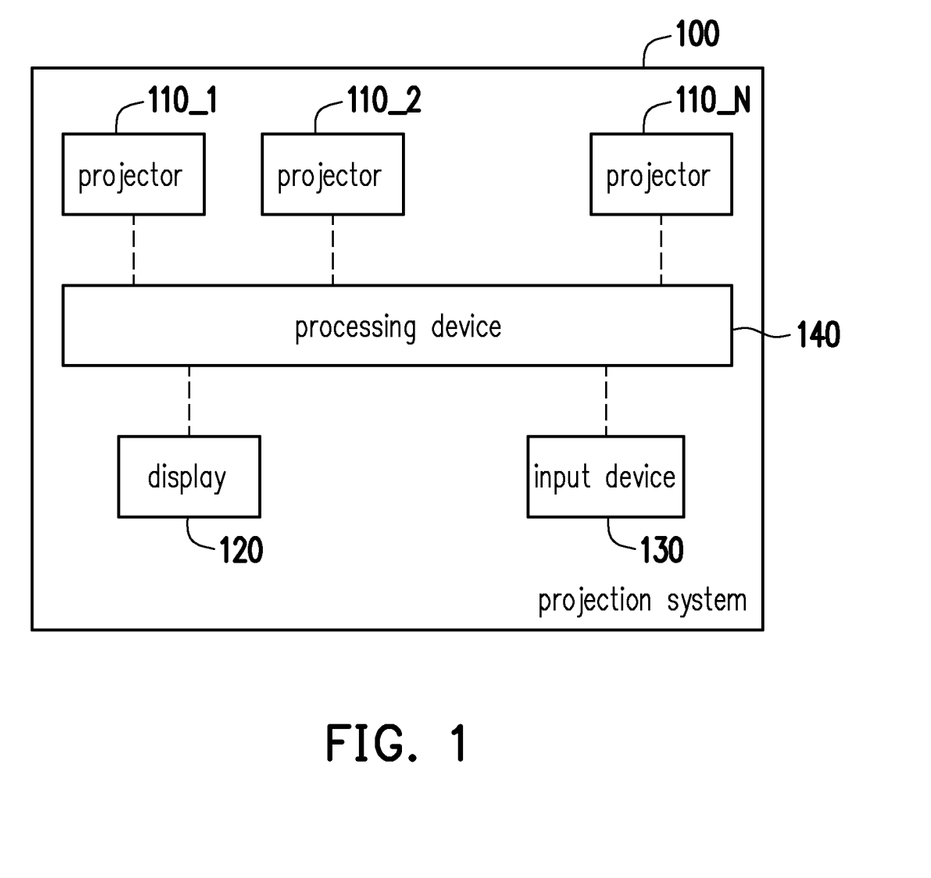
FIG. 1 is a block diagram of a projection system according to an embodiment of the disclosure.

FIG. 1 is a block diagram of a projection system according to an embodiment of the disclosure, which is only for convenience of description and is not intended to limit the disclosure. First, FIG. 1 introduces all components and configuration relationships in the system, and detailed functions will be disclosed in conjunction with FIG. 2.

Please refer to FIG. 1. A projection system 100 includes projectors 110_1 to 110_N, a display 120, an input device 130, and a processing device 140. The processing device 140 is connected to the projectors 110_1 to 110_N, the display 120, and the input device 130.

The projectors 110_1 to 110_N are configured to project projection images on a wall, a screen, and other planes, and the projectors 110_1 to 110_N may be liquid crystal projectors (LCP), digital light processing (DLP) projectors, or reflective liquid crystal on silicon (LCOS) projection display devices, etc. In the embodiment, the projectors 110_1 to 110_N may also include light source modules, opto-mechanical modules, lens modules, related optical and circuit control elements, image processing circuits, etc.

The display 120 is configured to display an image, and the display 120 may be a liquid crystal display (LCD), a light-emitting diode (LED) display, or other similar devices. The input device 130 may be an input device that allows the user to interact with the display screen of the display 110, such as a mouse, a handheld controller, a joystick, a trackball, a keyboard, etc. In an embodiment, the display 120 and the input device 130 may also be a touch screen that simultaneously provide display and input functions, that is, a display integrated with touch detection elements. In addition, the touch detection elements are configured in columns and rows on the display 120, and are configured to detect the touch of the fingers, palm, or other objects of the user on the touch screen. The touch detection element may be, for example, a capacitive touch detection element, a resistive touch detection element, a surface acoustic wave touch detection element, an electromagnetic touch detection element, an optical touch detection element, or a near-field imaging touch detection element.

The processing device 140 includes a memory and a processor. The processing device 140 may be a computer control system with computing capabilities, such as a desktop computer, a notebook computer, a work station, an industrial computer, a server host, etc. The memory may be any type of fixed or removable random access memory (RAM), read-only memory (ROM), flash memory, hard disk, or other similar devices, integrated circuits, and a combination thereof, and is configured to store buffer data, permanent data, and data such as a compiler program configured to execute the functions of the processing device 140. The processor may be a central processing unit (CPU), a graphics processing unit (GPU), other programmable general-purpose or special-purpose microprocessors, digital signal processors (DSP), programmable controllers, application specific integrated circuits (ASIC), programmable logic devices (PLD), other similar devices, integrated circuits, and a combination thereof.

Figure 2:
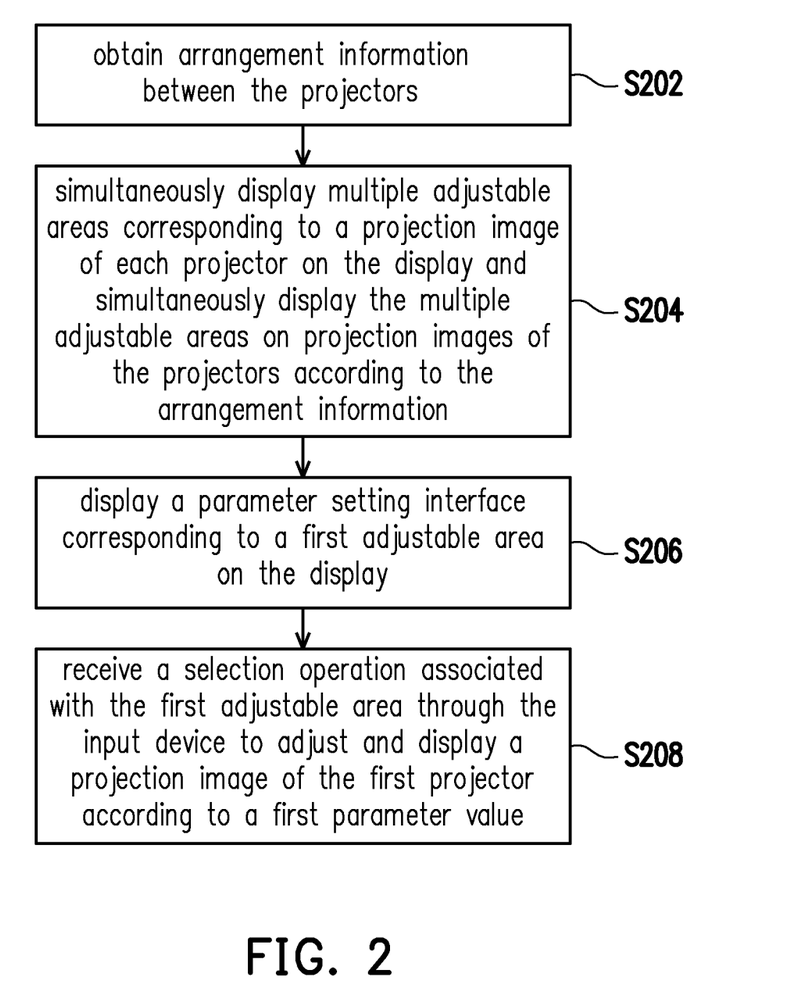
FIG. 2 is a flowchart of a projection image adjustment method according to an embodiment of the disclosure.

FIG. 2 is a flowchart of a projection screen adjustment method according to an embodiment of the disclosure, and the steps of FIG. 2 may be implemented by the elements of the projection system 100 shown in FIG. 1.

Please refer to FIG. 1 and FIG. 2 at the same time. First, the processing device 140 obtains the arrangement information between the projectors 110_1 to 110_N (Step S202). The arrangement information here is information that may represent the relative positional relationship between the projectors 110_1 to 110_N, the arrangement information may be stored in the processing device 140 in advance, obtained by the processing device 140 through the input by the user received by the input device 130, or determined by a built-in detection mechanism.

Next, the processing device 140 simultaneously displays multiple adjustable areas corresponding to the projection images of the projectors 110_1 to 110_N on the display 110 and simultaneously displays the multiple adjustable areas on the projection images of the projectors 110_1 to 110_N according to the arrangement information (Step S204). In this way, the processing device 140 allows the user to simultaneously view the adjustable areas corresponding to the projectors 110_1 to 110_N and the projection images collaged by the projectors 110_1 to 110_N in the subsequent steps, so that the user may more intuitively determine whether an adjusted result meets expectations.

Specifically, the processing device 140 displays a parameter setting interface corresponding to a first adjustable area on the display 120. The first adjustable area corresponds to a first projector (such as the projector 110_1) among the projectors 110_1 to 110_N (Step S206). The processing device 140 receives a selection operation associated with the first adjustable area through the input device 130 to adjust and display the projection image of the first projector 110_1 according to a first parameter value (Step S208). Here, the processing device 140 may automatically detect to determine that the first adjustable area needs to be adjusted or obtain the selection by the user on the first adjustable area through the input device 130 to determine that the first adjustable area needs to be adjusted. After that, the processing device 140 displays the parameter setting interface corresponding to the first adjustable area on the display 120 to allow the user to adjust the parameter value of the first adjustable area, and transmits the adjusted parameter value (i.e. the "first parameter value") to the first projector 110_1, so that the first projector 110_1 may simultaneously project the projection image according to the first parameter value.

In order to understand the process more clearly, a 1×2 collage screen of the projector 110_1 and the projector 110_2 will be described below, and the following embodiment may also be implemented by the elements of the projection system 100 shown in FIG. 1.

Figure 3:
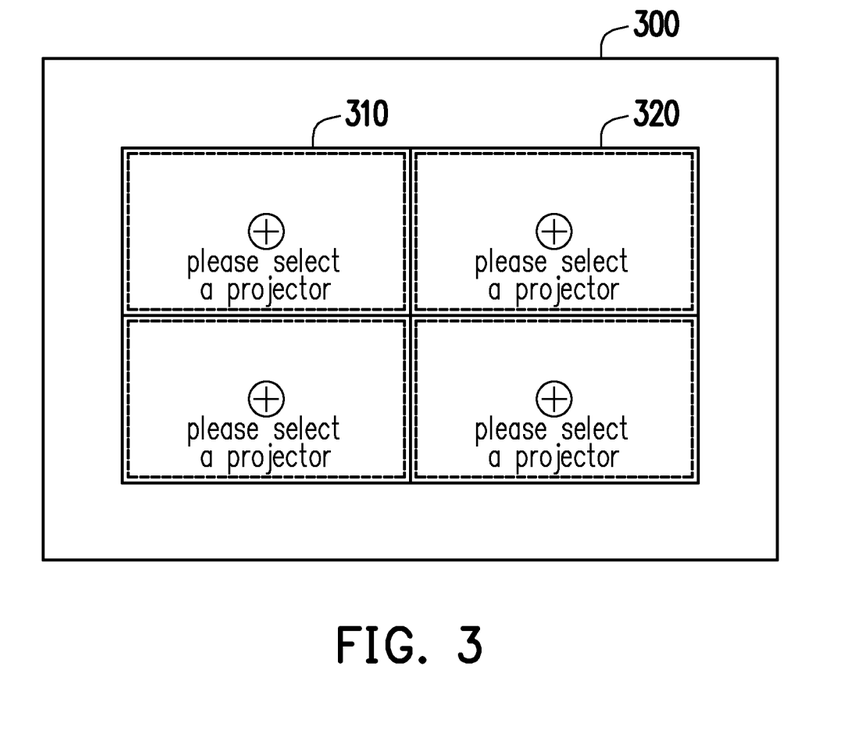
FIG. 3 is a schematic diagram of a setting interface of an arrangement position of a projector according to an embodiment of the disclosure.

In the embodiment, first, the processing device 140 obtains the relative positional relationship between the projector 110_1 and the projector 110_2, and calculates the overlapping area and the non-overlapping area of the projection images of the projector 110_1 and the projector 110_2 according to the relative positional relationship. Taking a schematic diagram of a setting interface of an arrangement position of a projector according to an embodiment of the disclosure shown in FIG. 3 as an example, the processing device 140 may first display a setting interface 300 on the display 120 to guide the user to input the arrangement position of the projector 110_1 and the projector 110_2. The user may select a setting area 310 and a setting area 320 corresponding to the arrangement position of the projector 110_1 and the projector 110_2 from the setting interface 300 through the input device 130. The processing device 140 may detect the positions and the projection images of the projector 110_1 and the projector 110_2 accordingly, thereby calculating the overlapping area and the non-overlapping area of the two projection images.

Figure 4:
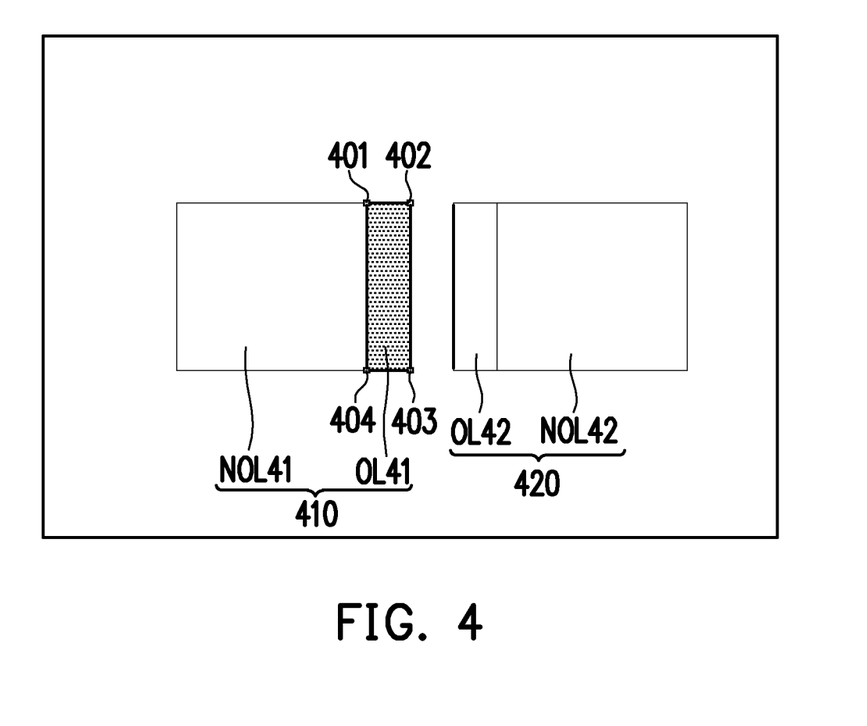
FIG. 4 is a schematic diagram of an adjustable area according to an embodiment of the disclosure.

Then, the processing device 140 simultaneously displays the overlapping area and the non-overlapping area corresponding to the projection images of the projector 110_1 and the projector 110_2 on the display 120 according to the arrangement information to respectively serve as the adjustable areas. The adjustable areas do not overlap with each other. Next, the processing device 140 receives the selection operation by the user for one of the adjustable areas to set the selected adjustable area as the first adjustable area mentioned in Step S206 in FIG. 2. Taking a schematic diagram of an adjustable area according to an embodiment of the disclosure shown in FIG. 4 as an example, areas 410 and 420 respectively correspond to the projectors 110_1 and 110_2, wherein OL41 and OL42 are overlapping areas, and NOL41 and NOL42 are non-overlapping areas. The user may select the area to be adjusted through the input device 130. In the embodiment, not only the brightness stacked by the projectors 110_1 and 110_2 in the overlapping areas may be adjusted, but also the color correction of the non-overlapping areas may be performed on the difference between the projectors 110_1 and 110_2, so the areas adjustable by the user are not limited to only the overlapping areas OL41 and OL42 or only the non-overlapping areas NOL41 and NOL42. Assuming that the adjustable area selected by the user is the overlapping area OL41, the processing device 140 sets the overlapping area OL41 as the first adjustable area.

In addition, the processing device 140 further displays control points on the first adjustable area, so that the user may finely adjust the range of the first adjustable area. Taking FIG. 4 as an example, the processing device 140 displays four control points 401 to 404 on the edges and corners of the overlapping area OL41. In other embodiments, the processing device 140 may also provide, for example, three types of the number of control points (4 points, 8 points, and 16 points) for the user to choose. However, since the wall, screen, etc. on which the projection images are projected by the projectors 110_1 to 110_N may not be flat or inclined to the projectors 110_1 to 110_N, the multiple overlapping areas and the multiple non-overlapping areas may not be regular rectangles. Therefore, more control points are needed for the user to adjust, so as to meet the actual situation.

Figure 5:
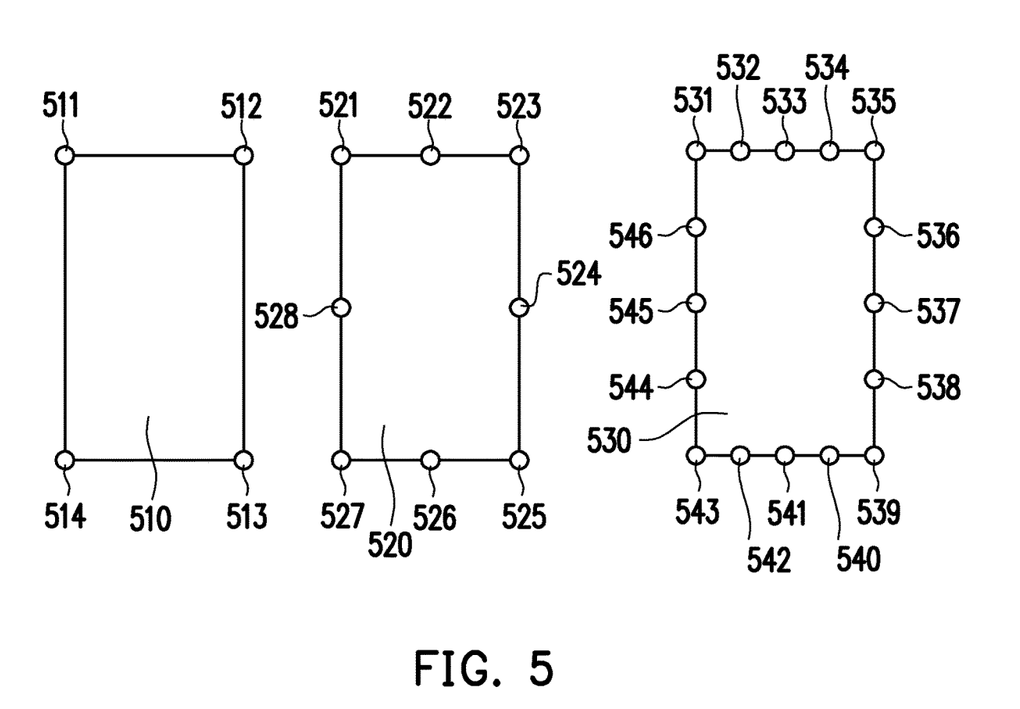
FIG. 5 is a schematic diagram of a first adjustable area and control points thereof according to an embodiment of the disclosure.

Taking a schematic diagram of a first adjustable area and control points thereof according to an embodiment of the disclosure shown in FIG. 5 as an example, when the number of control points is 4 points, control points 511 to 514 are displayed on the edges and corners of a first adjustable area 510. When the number of control points is 8 points, control points 521 to 528 are displayed on the edges and corners of a first adjustable area 520, and are evenly distributed on the connection line of the edges and corners. When the number of control points is 16 points, control points 531 to 546 are displayed on the edges and corners, and the connection line of the edges and corners of a first adjustable area 530.

In the embodiment, the processing device 140 receives a selection operation for one of the adjustable areas through the input device 130, and then displays multiple control points or multiple boundary lines of the selected adjustable area on the adjustment interface, so as to receive an movement operation by the user through the input device 130 for at least one control point or at least one boundary line to adjust the selected adjustable area to be set as the first adjustable area. For example, assuming that the user moves one of the control points (hereinafter referred to as "first control point") through the input device 130, the processing device 140 sets the area formed by the moved first control point and other control points as the first adjustable area. Assuming that the user moves one of the boundary lines (hereinafter referred to as "first boundary line") through the input device 130, the processing device 140 sets the area formed by the moved first boundary line and other boundary lines as the first adjustable area. In addition, in order to achieve a better user experience, the processing device 140 may selectively display multiple separation lines between the overlapping areas and the non-overlapping areas of all the projection images. The color of the separation lines is different from the color of the control points and the boundary lines of the first adjustable area.

Specifically, FIG. 6A to FIG. 6D are schematic diagrams of adjustment interfaces of adjustable areas according to an embodiment of the disclosure.

Figure 6A:
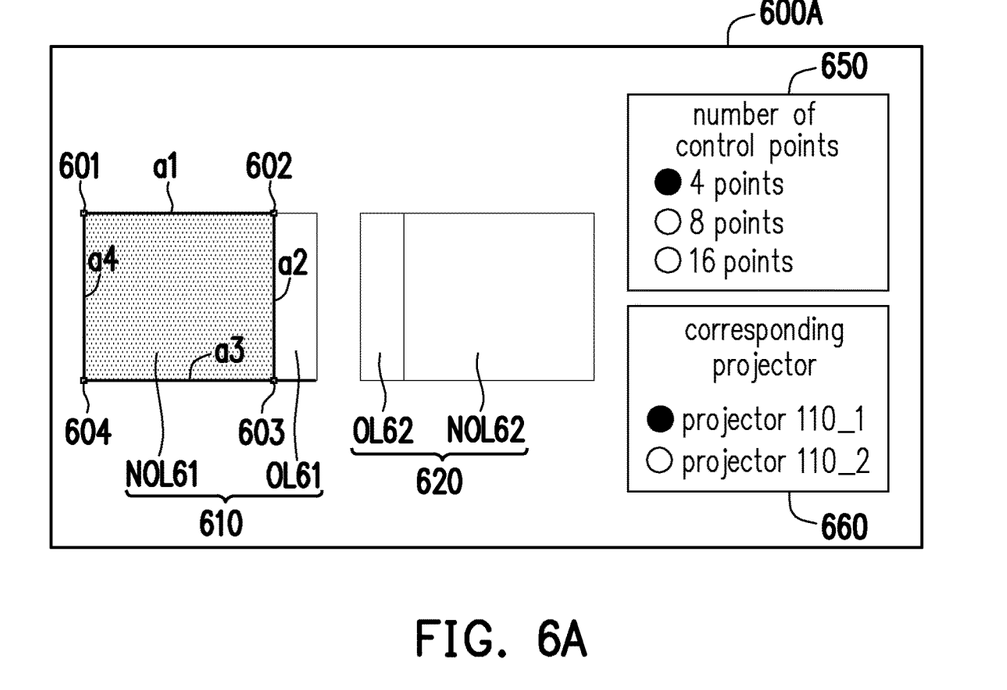
FIG. 6A to FIG. 6D are schematic diagrams of adjustment interfaces of adjustable areas according to an embodiment of the disclosure.

Please refer to FIG. 6A. Areas 610 and 620 on an adjustment interface 600A respectively correspond to the projectors 110_1 and 110_2, wherein OL61 and OL62 are overlapping areas, and NOL61 and NOL62 are non-overlapping areas. Here, the adjustable area selected by the user is a non-overlapping area NOL61. The processing device 140 displays four preset control points 601 to 604 and boundary lines a1 to a4 of the adjustable area NOL61 on the adjustment interface 600A. In the embodiment, the adjustment interface 600A also includes an adjustment area 650 for the number of control points and a display area 660 for presenting projector information corresponding to the adjustable area NOL61, but the disclosure is not limited thereto. The user may increase the number of control points from 4 points to 8 points in the adjustment area 601A for the number of control points on the adjustment interface 600A, thereby proceeding to an adjustment interface 600B of FIG. 6B for finer adjustments. In addition, the processing device 140 may selectively display multiple separation lines between the overlapping areas OL61 and OL62 and the non-overlapping area NOL62 of all the projection images. The color of the separation lines is different from the color of the control points and the boundary lines of the non-overlapping area NOL61 (i.e. the first adjustable area).

Figure 6B:
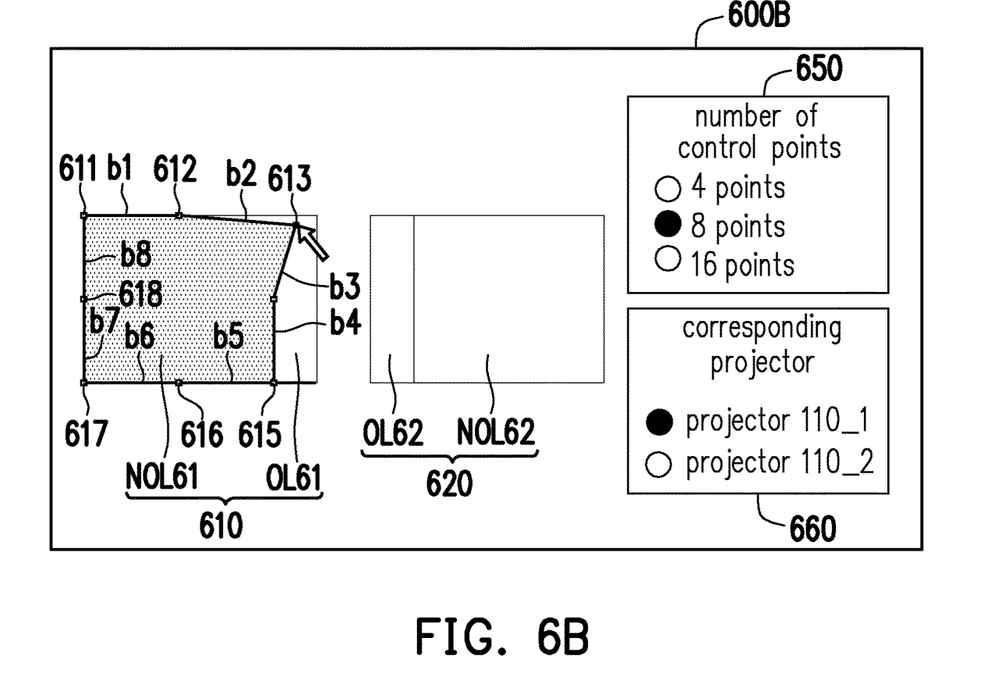

Please refer to FIG. 6B. In the embodiment, the processing device 140 displays eight control points 611 to 618 and boundary lines b1 to b8 of the adjustable area NOL61 on the adjustment interface 600B. For example, the user may adjust the position of the control point 613 by selecting the control point 613 and dragging with the mouse (the input device 130) or moving with the arrow keys of the keyboard (input device 130). When the control point 613 is moved, line segments b2 and b3 at two ends of the control point 613 are also changed accordingly, so that the user may move the boundary line of the adjustable area NOL61 to the boundary line corresponding to the overlapping area of the actual projection image. It is worth mentioning that in another embodiment, the user can directly move the boundary line of the adjustable area NOL61 without adjusting through the control points, and the disclosure is not limited thereto. No matter what way is used to adjust the adjustable area NOL61, the processing device 140 will synchronously project on the projection image according to the adjustment by the user, so that the user may instantly confirm whether the adjustable area NOL61 completely overlaps with the area to be adjusted.

Figure 6C:
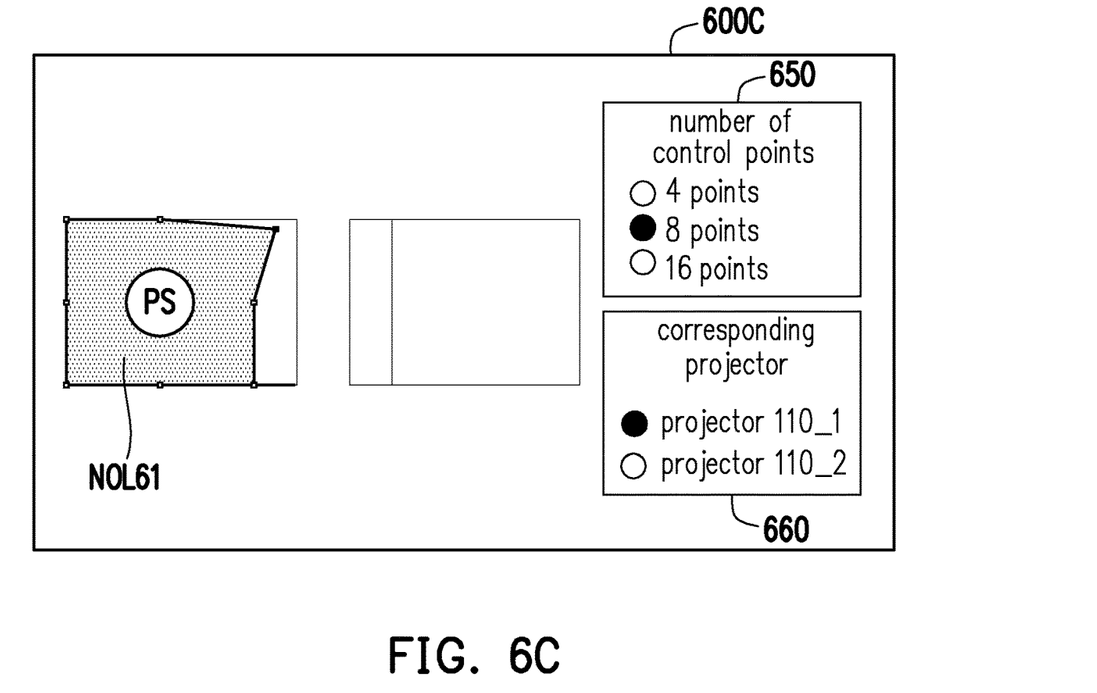

After the user finishes adjusting the adjustable area NOL61, the relevant parameters (such as color (RGB) values) of the adjustable area NOL61 may be modified. The color (RGB) values are representative values easily known to persons skilled in the art. For example, an adjustment interface 600C of FIG. 6C is displayed on the display 120. After the user selects a parameter setting pattern PS, an adjustment interface 600D of FIG. 6D may be proceeded.

Figure 6D:
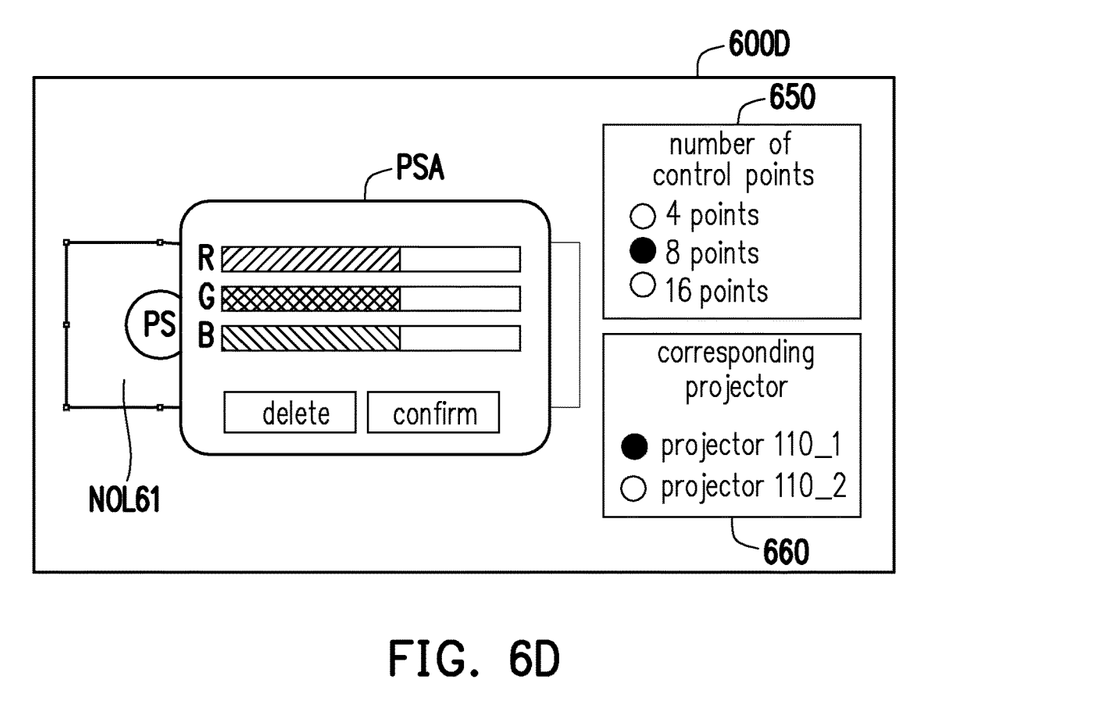

Please refer to FIG. 6D. An adjustment interface 600D presents a parameter setting interface PSA of the adjustable area NOL61. In the embodiment, the user may adjust the RGB values by using a mouse or touch and drag. In other embodiments, the user may also use the keyboard to input RGB values. The processing device 140 transmits the RGB values to the projector 110_1. The projector 110_1 may synchronously adjust the projection image thereof according to the RGB values, so that the user may observe whether the correction has been completed.

After the user finishes adjusting one of the adjustable areas, the processing device 140 may also provide the user to directly apply the adjusted parameter value of the adjustable area to other adjustable areas. For example, assuming that before adjusting the first adjustable area, there is already an adjusted adjustable area (hereinafter referred to as "second adjustable area"), the processing device 140 will perform the selection operation of the first adjustable area according to the selection operation of the second adjustable area. Specifically, the processing device 140 may receive the copy operation for the second adjustable area through the input device 130, and set the first parameter value of the first adjustable area corresponding to the second parameter value of the copy operation of the second adjustable area.

Figure 7:
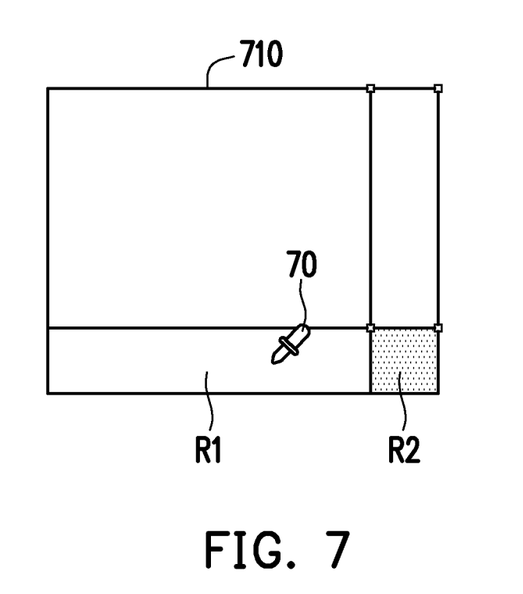
FIG. 7 is a schematic diagram of a copy operation according to an embodiment of the disclosure.

Taking a schematic diagram of a copy operation according to an embodiment of the disclosure shown in FIG. 7 as an example, assuming that an area 710 corresponds to the projector 110_1, if the user intends to apply the parameter value of an adjusted area R2 to an area R1 to be adjusted, the processing device 140 may provide a quick tool such as an eyedropper tool 70 to absorb the color first (that is, to copy the selection operation of the parameter value of the adjusted area R2), so as to copy the parameter value of the adjusted area R2, and then fill the color in the area R1 to be adjusted, so as to apply the parameter value of the adjusted area R2 to the area R1 to be adjusted, which greatly saves the setting time by the user.

In summary, in the projection system and the projection image adjustment method thereof proposed by the disclosure, after setting the arrangement information between multiple projectors, the user only needs to finely adjust the area with black level to solve the uneven color brightness or abrupt color block performance the during projection collage, so as to achieve the integration of the overall projection collage screen in an intuitive and simple way.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be configured to interpret or limit the scope or meaning of the claims. Any advantages and benefits described may not apply to all embodiments of the invention. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A projection image adjustment method, applicable to a processing device connected to a plurality of projectors, a display, and an input device, the projection image adjustment method comprising steps of:

inputting, by the input device, arrangement information between the plurality of projectors to the processing device;

displaying a plurality of adjustable areas corresponding to a projection image of each of the plurality of projectors on the display connected to the processing device; and displaying the plurality of adjustable areas on projection images of the plurality of projectors according to the arrangement information;

displaying a parameter setting interface corresponding to a first adjustable area of the plurality of adjustable areas on the display connected to the processing device, wherein the first adjustable area corresponds to a first projector of the plurality of projectors; and receiving a selection operation associated with the first adjustable area of the plurality of adjustable areas through the input device to adjust and display a projection image of the first projector according to a first parameter value, wherein the step of receiving the selection operation associated with the first adjustable area of the plurality of adjustable areas through the input device comprises steps of:

receiving the selection operation for one of the plurality of adjustable areas through the input device;

displaying a plurality of control points or a plurality of boundary lines associated with the selected adjustable area on an adjustment interface of the display, wherein the adjustment interface includes an adjustment area for adjusting a number of the plurality of control points and the plurality of control points are individually adjusted;

receiving a selection operation for the number of the plurality of control points and a movement operation for at least one of the control points or at least one of the boundary lines through the input device; and adjusting the selected adjustable area to be set as the first adjustable area according to the movement operation.

2. The projection image adjustment method according to claim 1, wherein the step of inputting, by the input device, the arrangement information between the plurality of projectors to the processing device comprises:

receiving a relative positional relationship between the plurality of projectors from the input device; and calculating an overlapping area and a non-overlapping area of the projection image of each of the plurality of projectors according to the relative positional relationship, wherein the overlapping area and the non-overlapping area are set as the arrangement information.

3. The projection image adjustment method according to claim 2, wherein the step of displaying the adjustable areas corresponding to the projection images of the projectors on the display connected to the processing device and displaying the plurality of adjustable areas on the projection images of the plurality of projectors according to the arrangement information comprises:

displaying the overlapping area and the non-overlapping area corresponding to the projection image on the display connected to the processing device to respectively serve as each of the plurality of adjustable areas, wherein on the display, the adjustable areas of the plurality of projectors do not overlap with each other.

4. The projection image adjustment method according to claim 1, wherein the step of receiving the selection operation associated with the first adjustable area of the plurality of adjustable areas further comprises:

executing the selection operation in the first adjustable area according to the selection operation of a second adjustable area of the plurality of adjustable areas.

5. The projection image adjustment method according to claim 4, wherein the step of executing the selection operation in the first adjustable area according to the selection operation of the second adjustable area of the plurality of adjustable areas further comprises:

receiving a copy operation of the second adjustable area through the input device; and setting the first parameter value according to a second parameter value generated by the copy operation corresponding to the second adjustable area.

6. The projection image adjustment method according to claim 1, wherein the movement operation is moving a position of a first control point among the control points, and the step of adjusting the selected adjustable area to be set as the first adjustable area according to the movement operation comprises:

setting an area formed by the moved first control point or a moved first boundary line and other control points or other boundary lines as the first adjustable area.

7. The projection image adjustment method according to claim 1, wherein the display further displays a plurality of separation lines between an overlapping area and a non-overlapping area corresponding to the projection image of each of the plurality of projectors, and colors of the control points and the boundary lines are different from a color of the separation lines.

8. The projection image adjustment method according to claim 1, wherein the step of receiving the selection operation associated with the first adjustable area to adjust and display the projection image of the first projector according to the first parameter value further comprises:

transmitting the first parameter value to the first projector, wherein the first projector synchronously adjusts the projection image according to the first parameter value.

9. A projection system, comprising a plurality of projectors, an input device, a display, and a processing device, wherein:

the processing device is connected to the plurality of projectors and the display, the processing device is configured to receive arrangement information between the plurality of projectors from the input device;

the display is configured to display a plurality of adjustable areas corresponding to a projection image of each of the plurality of projectors and the plurality of projectors are configured to display the plurality of adjustable areas on projection images of the plurality of projectors according to the arrangement information;

the display is configured to display a parameter setting interface corresponding to a first adjustable area of the plurality of adjustable areas on the display connected to the processing device, wherein the first adjustable area corresponds to a first projector of the plurality of projectors; and the processing device is configured to receive a selection operation associated with the first adjustable area of the plurality of adjustable areas through the input device and the first projector is configured to project a projection image according to a first parameter value, wherein the processing device is configured to receive the selection operation for one of the plurality of adjustable areas through the input device;

the display is configured to display a plurality of control points or a plurality of boundary lines associated with the selected adjustable area on an adjustment interface of the display, and the adjustment interface includes an adjustment area for adjusting a number of the plurality of control points wherein the plurality of control points are individually adjusted;

through the input device, the processing device is configured to receive a selection operation for the number of the plurality of control points and a movement operation for at least one of the control points or at least one of the boundary lines; and the processing device is configured to adjust the selected adjustable area to be set as the first adjustable area according to the movement operation.

10. The projection system according to claim 9, wherein the processing device receives a relative positional relationship between the plurality of projectors from the input device, and calculates an overlapping area and a non-overlapping area of the projection image of each of the plurality of projectors according to the relative positional relationship.

11. The projection system according to claim 10, wherein the processing device displays the overlapping area and the non-overlapping area corresponding to the projection image on the display connected to the processing device to respectively serve as each of the plurality of adjustable areas, wherein on the display, the adjustable areas of the plurality of projectors do not overlap with each other.

12. The projection system according to claim 9, wherein the processing device executes the selection operation in the first adjustable area according to the selection operation of a second adjustable area of the plurality of adjustable areas.

13. The projection system according to claim 12, wherein the processing device further receives a copy operation of the second adjustable area through the input device, and sets the first parameter value according to a second parameter value generated by the copy operation corresponding to the second adjustable area.

14. The projection system of claim 9, wherein the first parameter value comprises a color value.

15. The projection system according to claim 9, wherein the processing device further transmits the first parameter value to the first projector, wherein the first projector synchronously adjusts the projection image according to the first parameter value.

* * * * *